May 30, 1972  M. C. SARNES  3,666,454
METHOD OF MAKING LARGE SINTERED POWDERED METAL PARTS WITHOUT DIES
Filed Dec. 4, 1970  2 Sheets-Sheet 1
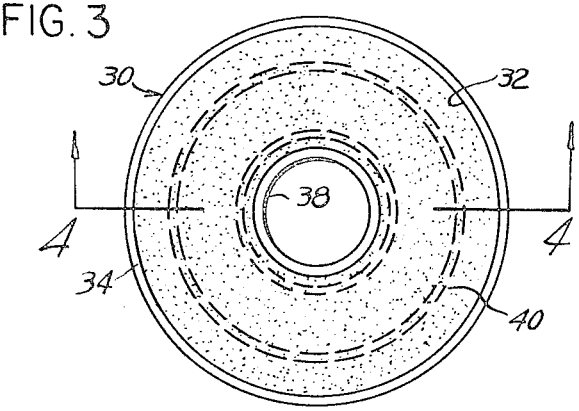
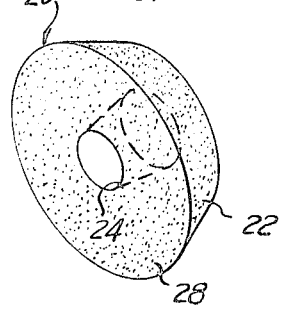
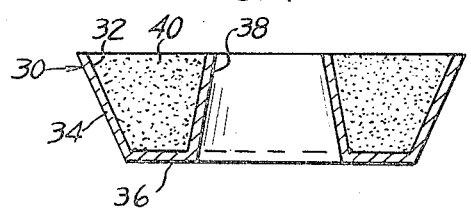
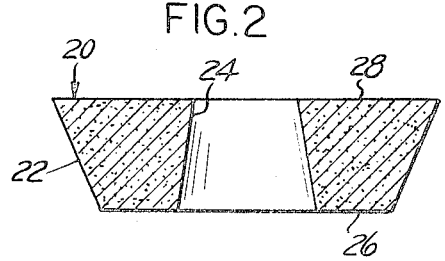
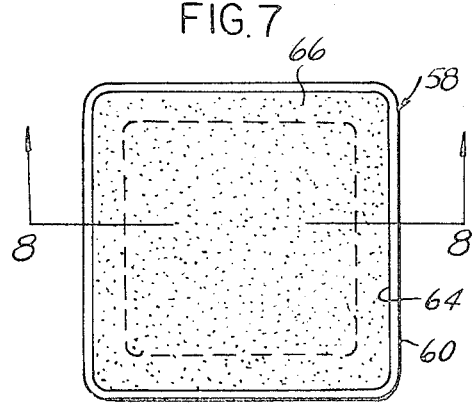
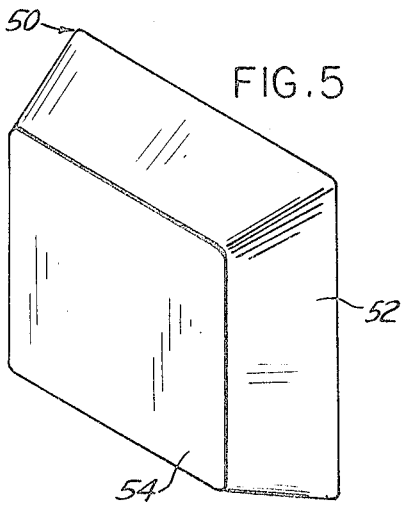
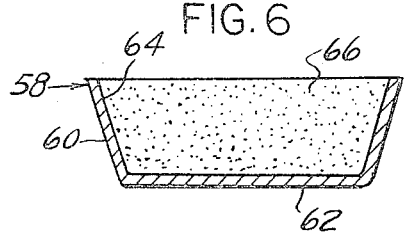
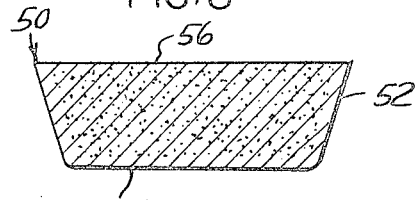
INVENTOR
MYRON C. SARNES
BY Barthel & Bugbee
ATTORNEYS

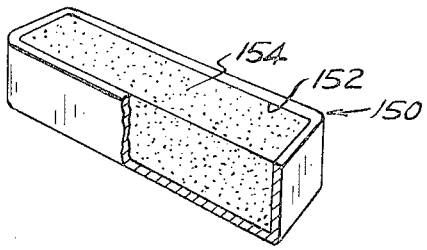
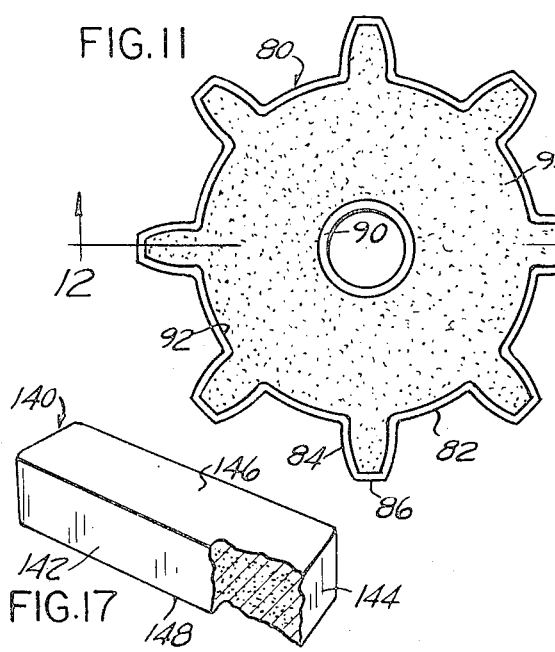
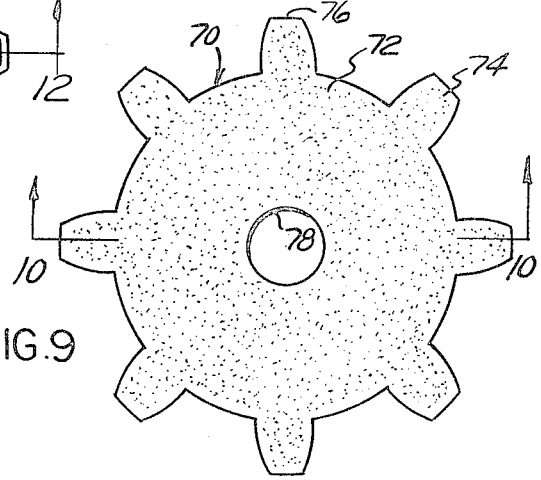
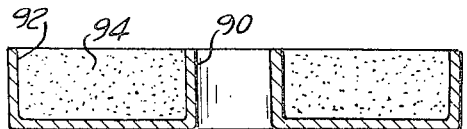
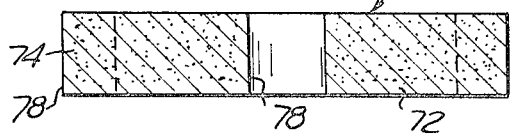
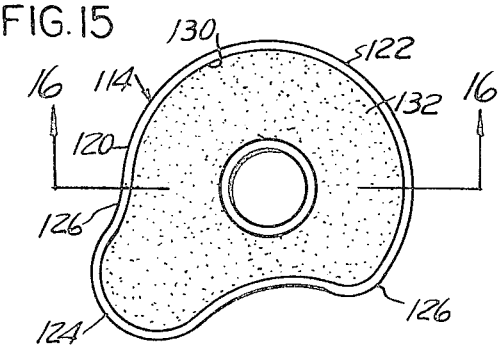
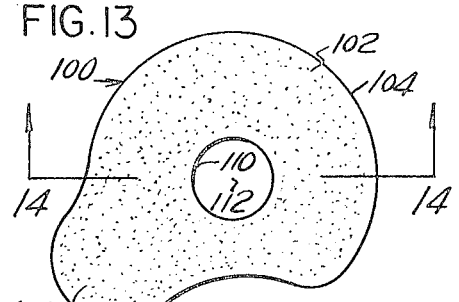
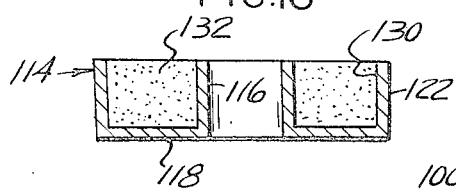
INVENTOR
MYRON C. SARNES
BY Barthel & Bugbee
ATTORNEYS United States Patent Office 3,666,454
Patented May 30, 1972

3,666,454
METHOD OF MAKING LARGE SINTERED
POWDERED METAL PARTS WITHOUT DIES
Myron C. Sarnes, Northville, Mich., assignor to Federal-Mogul Corporation, Southfield, Mich.
Filed Dec. 4, 1970, Ser. No. 95,266
Int. Cl. B22f 3/10
U.S. Cl. 75—200          3 Claims

ABSTRACT OF THE DISCLOSURE

A container of infiltratable metal, such as brass or copper, and of the approximate shape desired for the finished part, is stamped or otherwise formed, filled with the metal powder of which the part is to be made, placed in a sintering oven and sintered. During sintering, the container holds the particles of the powder together until they coalesce, whereupon the continued application of heat causes the container to melt and the metal of which it is composed to flow into the interstices between the powdered metal parrticles, thereby infiltrating the part. The part can then be further densified, if desired, by forging, and teeth formed.

BACKGROUND OF INVENTION

Hitherto, small parts have been formed from powdered metal compressed in dies into briquettes which when sintered produced durable bodies that otherwise would cost much more if machined from solid metal. Large parts of powdered metal, however, require correspondingly large dies and consequently require huge expensive presses in order to exert the enormous pressures necessary to form the large briquettes. The present invention eliminates the necessity for such large die sets and large presses in which they are used.

In the drawings:

FIG. 1 is a perspective view, on a reduced scale, of a lare annular frusto-conical sintered powdered metal part produced without dies, according to the present invention;

FIG. 2 is an enlarged diametral section through the part shown in FIG. 1;

FIG. 3 is a top plan view of an annular infiltratable container filled with powdered metal prior to sintering for producing the part shown in FIGS. 1 and 2;

FIG. 4 is a diametral section taken along the line 4—4 in FIG. 3;

FIG. 5 is a perspective view of a frusto-pyramidal sintered powdered metal part produced by the method of this invention;

FIG. 6 is a cross-section through the part shown in FIG. 5;

FIG. 7 is a top plan view of a shaped infiltratable container filled with powdered metal prior to sintering, for producing the part shown in FIGS. 5 and 6;

FIG. 8 is a cross-section taken along the line 8—8 in FIG. 7;

FIG. 9 is a top plan view of a sintered powdered metal sprocket part produced, according to the method of this invention;

FIG. 10 is a cross-section taken along the line 10—10 in FIG. 9;

FIG. 11 is a top plan view of a shaped infiltratable container filled with powdered metal prior to sintering, for producing the sprocket part shown in FIGS. 9 and 10;

FIG. 12 is a cross-section taken along the line 12—12 in FIG. 11;

FIG. 13 is a top plan view of a sintered powdered metal cam produced according to the method of this invention;

FIG. 14 is a cross-section taken along the line 14—14 in FIG. 13;

FIG. 15 is a top plan view of a cam-shaped infiltratable container filled with powdered metal prior to sintering, for producing the cam shown in FIGS. 13 and 14;

FIG. 16 is a cross-section taken along the line 16—16 in FIG. 15;

FIG. 17 is a perspective view, on a reduced scale, of a large rectangular hollow block-shaped sintered powdered metal part produced without dies, according to the present invention; and FIG. 18 is a perspective view of a rectangular hollow block-shaped infiltratable container filled with powdered metal prior to sintering, for producing the part shown in FIG. 17.

Referring to the drawings in detail, FIGS. 1 and 2 show, on a reduced scale, a large annular part, generally designated 20, of sintered powdered metal having a frusto-conical outer surface 22 and a frusto-conical bore 24 extending between a bottom surface 26 and a top surface 28. It will be understood that the actual size of the part 20, as produced by the invention, is about four times the size shown in FIG. 2.

To produce the annular frusto-conical part 20 shown in FIGS. 1and 2, there is first formed, as by stamping or casting, a correspondingly-shaped container, generally designated 30, having a channel 32 of the same size as the part 20 to be produced and formed of a metal or metal alloy which is infiltratable into the powdered metal, for example, powdered iron, of which the part 20 is to be formed. The container 30, for use with powdered iron, is conveniently made of copper or brass, both of which have a melting point lower than powdered iron. The container or receptacle 30, for purposes of illustration, is shown as having a frusto-conical inner wall 38 spaced radially away from the outer wall by the bottom wall 36.

The infiltratable container or receptacle 30 is now filled with a powdered metal charge 40, such as powdered iron, with or without vibration effect settling of the powder, and transfered to a conventional sintering furnace where it is sintered, preferably in a protective atmosphere such as hydrogen, at the usual times and temperatures customary for powdered metal objects of a similar size and material. During the sintering operation, the metal or metal alloy of which the container 30 is composed, being necessarily of a lower melting point than the powdered metal charge 40, melts and at the same time infiltrates the pores of the powdered metal charge 40 and virtually disappears, leaving only a flash coating, if at all, of copper or brass color on the adjacent surfaces 22, 24 and 26 of the article 20 thus produced. In order to further densify the part 20, if desired, the part 20 is subjected to a forging treatment by a conventional forging machine.

The large sintered powdered metal frusto-pyramidal part, generally designated 50, shown in FIGS. 5 and 6 is of approximately rectangular cross-section and has flat sides 52 diverging from a flat base surface 54 to a flat top surface 56. To produce the part 50, there is formed a hollow infiltratable container or receptacle 58 with side walls 60 diverging upward from a flat base 62. The container or receptacle 58 contains a cavity 64 and is, as before, formed of a metal or metal alloy of lower melting point than the powdered metal of which the part 50 is to be composed. The container 58 is conveniently formed by stamping or casting from copper or brass.

To form the part 50, the operator fills the cavity 64 with a charge 66 of powdered metal, such as powdered iron, and transfers the thus filled container 58 to a sintering oven, where sintering is carried out, preferably in a protective atmosphere, at the usual times and temperatures for such powdered metal and objects of similar size. During the sintering operation, the metal or metal alloy of which the container 58 is composed, melts and infiltrates into the pores of the powdered metal charge 66 while the particles thereof coalesce, leaving the part 50 with its side and bottom surfaces 52 and 54 with only a flash coating, if at all, of copper or brass. As before, in order to densify the part 50, it may, as before, be subjected to a forging treatment.

The large sintered powdered metal sprocket part 70 shown in FIGS. 9 and 10 has an approximately cylindrical body portion 72 with tapered sprocket teeth 74 projecting radially therefrom having arcuate tip surfaces 76 disposed in circumferentially-spaced relationship and having a shaft bore 78 of cylindrical shape extending through the center thereof. To produce the sprocket 70, a correspondingly-shaped container or receptacle 80 is formed by stamping or casting from an infiltratable metal, such as copper or brass having an approximately cylindrical central portion 82 with hollow tapered projections 84 terminating in circumferentially-spaced arcuate tip end walls 86 and extending downward to an annular bottom wall 88 which extends inward to a central hollow cylindrical wall 90. These walls define a sprocket-shaped cavity 92. As before, a charge 94 of suitable powdered metal is placed in the cavity 92 and this assembly similarly sintered. As a result, the container 80 disappears by infiltration into the interstices or pores of the powdered iron or powdered iron charge, leaving the sprocket 70 with only a flash coating, if at all, of the container metal or metal alloy.

The large sintered powdered metal cam 100, shown in FIGS. 13 and 14, has a main or body portion 102 with a circularly-arcuate peripheral dwell surface 104 merging into a nose portion 106 with an arcuate peripheral surface 108. A central shaft bore 110 has a central axis 112 with which the dwell surface 104 is concentric. The cam 100 is produced in a manner similar to that described above by the use of a cam-shaped container or receptacle 114 having a central hollow cylindrical inner wall 116, a bottom wall 118 and a peripheral wall 120 composed partly of a concentric wall portion 122 coaxial with the inner wall 116 and a nose wall 124 projecting therefrom at turning points 126 and 128 respectively. The container or receptacle 114 is stamped from infiltratable metal, such as copper or brass, and its cavity 130 filled with a charge 132 of powdered metal, such as powdered iron. This assembly is then sintered as before, and, if desired, forged in order to densify it, in the manner described above.

Thus, it will be seen from the foregoing examples, that the present invention enables the production of large sintered powdered metal parts without the need for large dies or large presses, thereby not only saving the high cost of such dies but also the enormous cost of the high capacity presses required to sufficiently compress powdered metal into large briquettes. Furthermore, it will also be apparent that the present invention enables the production of sintered powdered metal parts which could not readily be withdrawn from an ordinary die cavity, such as parts which are larger in diameter at intermediate locations than at their opposite ends. Since the present invention requires only an infiltratable container or receptacle, such a container with inwardly-turned upper edges can be produced and used according to the method of the present invention to produce such an intermediately enlarged part since the container disappears into the part and the parts does not have to be removed from a die cavity. Moreover, the pressures and presses required to produce the large thin-walled container or receptacles from infiltratable metals or metal alloys such as copper or brass are very small in comparison with the pressures and presses required to produce large briquettes from powdered metals such as iron, steel, bronze or the like.

The large rectangular block-shaped part, generally designated 140, shown in FIG. 17 has side surfaces 142, end surfaces 144 and top and bottom surfaces 146 and 148 respectively. The part 140 is shown as a rectangular block with side and end surfaces 142 and 144 substantially vertical rather than inclined as in the part 20 shown in FIG. 2 or the part 50 shown in FIG. 6.

To produce the rectangular block-shaped part 140 shown in FIG. 17, there is first formed, as by stamping or casting, a correspondingly-shaped container, generally designated 150 (FIG. 18), of cup-shaped form having a cavity 152 of the same size and shape as the part 140 to be produced and formed of a metal or metal alloy which is infiltratable into the powdered metal, for example, powdered iron, of which the part 140 is to be formed. The container 150, for use with powdered iron, is, as in FIGS. 1 to 7 inclusive conveniently made of copper or brass, both of which have a melting point lower than powdered iron.

The cavity 152 of the infiltratable container or receptacle 150 is now filled with a powdered metal charge 154, such as powdered iron, with or without vibration to effect settling of the powder charge 154 and then transferred to a conventional sintering furnace where it is sintered, preferably in a protective atmosphere such as hydrogen or ammonia, at the usual times and temperatures customary for powdered metal objects of a similar size and material. During the sintering operation, the metal or metal alloys of which the container 30 is composed, being necessarily of a lower melting point than the powdered metal charge 154, melts and at the same time infiltrates the pores of the powdered metal charge 154. As a result, the container 150 virtually disappears, leaving only a flash coating, if at all, of copper brass color, on the adjacent surfaces 142, 144 and 148 of the article 140 thus produced. If it is desired to further densify the part 140, it is subjected to a forging treatment by a conventional forging machine.

I claim:
1. A method of making a large sintered powdered metal part of a particular shape without requiring a die or a briquetting press, said method comprising
   forming a receptacle containing a cavity with a configuration corresponding to the shape of the part from metal selected from the group consisting of copper and copper alloys,
   depositing in said cavity a charge of powdered metal selected from the group consisting of iron and iron alloys of a volume sufficient to produce said part,
   and sintering said powdered metal charge in said receptacle at a temperature higher than the melting point of the container metal but lower than the melting point of said powdered metal for a time period sufficient to effect coalescence of the powdered metal particles and cause infiltration of the container metal or metal alloy into the interstices therebetween such that the part maintains the shape of the receptacle.

2. A method, according to claim 1, including in the forming of said receptacle the forming of an inner wall spaced inwardly away from the outer wall thereof and defining an open-centered cavity.

3. A method, according to claim 2, wherein the forming of said receptacle includes the forming of hollow radially-extending circumferentially-spaced projections forming correspondingly-located pockets extending outward from said cavity, and wherein the depositing of said charge of powdered metal includes filling said pockets therewith, and wherein said sintering also causes infiltration of said projections into said interstices and thereby creates a body with teeth projecting radially therefrom.

References Cited

UNITED STATES PATENTS

| | | | |
|---|---|---|---|
| 2,695,230 | 11/1954 | Haller | 75—208 |
| 2,695,231 | 11/1954 | Causley | 75—208 |
| 2,845,346 | 7/1958 | Scanlon et al. | 75—208 |

BENJAMIN R. PADGETT, Primary Examiner

B. H. HUNT, Assistant Examiner

U.S. Cl. X.R.

75—208 R